No. 712,367. Patented Oct. 28, 1902.
S. R. DUMMER, Jr.
GAGE.
(Application filed Nov. 4, 1901.)
(No Model.)
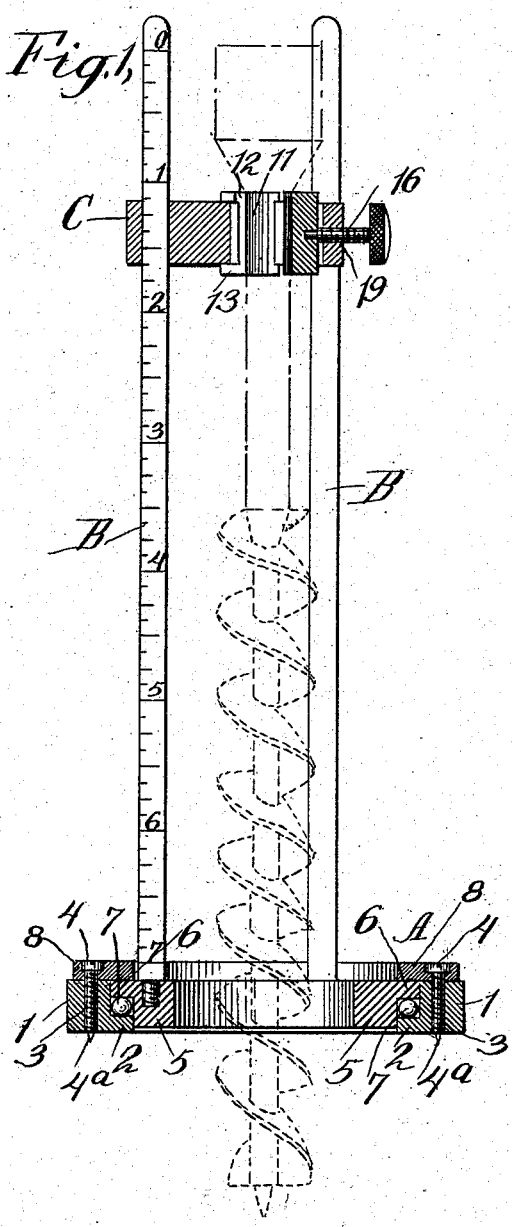
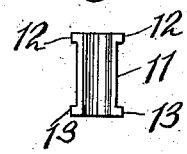
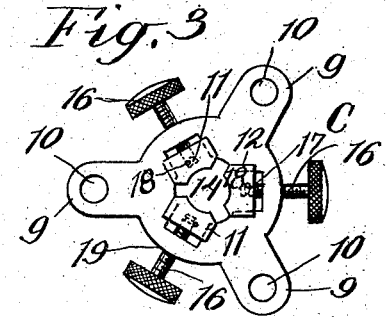
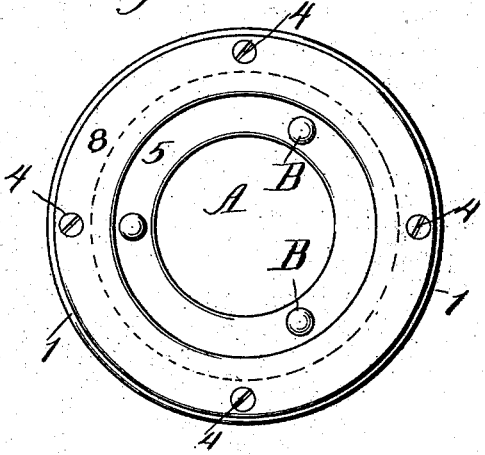
WITNESSES:
INVENTOR
S. R. Dummer Jr.
BY
Duell, Megrath & Barfield
ATTORNEYS.

UNITED STATES PATENT OFFICE.

SAMUEL RUSSELL DUMMER, JR., OF ROSELLE, NEW JERSEY.

GAGE.

SPECIFICATION forming part of Letters Patent No. 712,367, dated October 28, 1902.

Application filed November 4, 1901. Serial No. 81,011. (No model.)

*To all whom it may concern:*

Be it known that I, SAMUEL RUSSELL DUMMER, Jr., residing at Roselle, in the county of Union and State of New Jersey, have invented certain new and useful Improvements in Gages, of which the following is a full, clear, and exact description, such as will enable others skilled in the art to which it appertains to make and use the same.

My invention relates to gages, and especially to that class of gages used in connection with a bit or auger whereby the depth the auger has penetrated the material being bored is indicated by the gage.

The objects of my invention are to produce a gage that will accurately indicate the depth the auger is in the material at any time by a mere glance at the scale on the gage, that will be easily operated, that will keep its position on the material being bored, and will not mar such material.

It is also the object of my invention to produce a gage that is simple and that can be cheaply constructed.

With these objects in view my invention will now be described in detail; and it consists in a gage constructed in the manner pointed out in the following specification, reference being had to the accompanying drawings, which form a part of this specification.

Referring to the drawings, in which the same symbols of reference indicate the same parts in the several views, Figure 1 is a vertical longitudinal section of the gage, showing the auger in dotted lines held by the clamp. Fig. 2 is a top plan view of the gage with the clamp removed. Fig. 3 is a top plan view of the clamp; and Fig. 4 is an end view of one of the jaws of the clamp, the inner face being shown.

On the drawings the part lettered A represents the support for the indicator or gage-rods which are placed on the material to be bored.

B represents the indicator or gage-rods for indicating the depth the auger has penetrated the material and also for guiding the clamp.

C is the clamp which holds the auger.

Referring now to the support for the rods, the part marked 1 represents an outer ring having an inwardly-projecting flange 2 on its lower surface. This ring has screw-threaded holes 3 therein, in which are the screws 4, the points 4ª of the screws projecting beyond the lower surface of the ring. Fitting inside of the ring 1 is another ring 5, having an outwardly-projecting flange 6 projecting from its upper surface. The flange 6 overlaps the flange 2 and forms a race for the antifriction-balls 7. When the balls are in place in the race, the upper faces of the two rings are flush; but the lower face of the ring 2 projects slightly beyond the same face of the ring 5. To hold the two rings 2 and 5 together, another ring 8 is placed on the upper face thereof and extends partly over each of the rings 1 and 5. This ring 8 is held in place by the screws 4, which pass through holes in said ring before they enter the ring 2. The ring 5 has tapped through the upper surface thereof, preferably, three holes, into which the lower ends of the gage and guide-rods are screw-threaded. These rods are graduated from the top downward. Moving freely up and down on these guide-rods is the clamp C, which has three arms 9. In each of these arms is a hole 10, through which the rods B pass. Moving in guides in said clamp are the three jaws 11, having upper flanges 12 and lower flanges 13 to support and guide these jaws. These jaws are moved toward or from each other to vary the size of the opening 14 of the jaws by a thumb-screw 16. The inner end of each of these thumb-screws is grooved, as shown by dotted lines at 17, and has a pin 18 passing through the clamping-jaws and through this groove to permit the thumb-screw to be rotated in the jaw, but will not permit it to be withdrawn from the jaws. These thumb-screws are threaded in the side of the clamp at 19, as more clearly shown in Fig. 1. By turning these thumb-screws they will move in or out in the side of the clamp, bringing the clamping-jaws closer together or farther apart from each other and varying the size of the opening for different sizes of augers.

The device is operated as follows: The support A is placed on the material to be bored, the ends 4ª of the screws taking into the material to hold the support against any rotary or lateral motion. The auger is placed in the gage with its point in the material, its lower cutting edge being flush with the lower face of the ring 1 and resting on the top of the material to be bored. The clamp C is then placed on the gage-rods B, said rods passing up through the openings 10 in the arms of the clasp, and the jaws of the clasp are fastened to the shank of the auger in such position that the upper face of the clamp will be on the line "0" of the scale on the gage. The chuck of the brace is now fastened to the upper end of the bit or auger in a manner well known. As the brace is turned to force the auger or bit into the material to be bored the clamp being fastened to the auger will turn with it, and as the gage-rods pass through the openings in the arms of the clamp these rods will turn with the clamp. As the clamp descends with and the same distance as the auger the position or depth that the auger is in the material may be readily ascertained by simply reading the position of the upper face of the clamp on the scale-rod. In the example shown in Fig. 1 the upper face of the clamp is at about one and one-fourth inches on the scale, which shows that the auger has entered the material being bored about one and one-fourth inches. In order that the gage or scale rods may turn easily with the auger and brace, these rods are screw-threaded into the ring 5, which is supported on antifriction-balls in the outer ring 1, as shown in the drawings. It is also to be noted that the lower face of this ring is above the lower face of the ring 1, which rests against the material. This is so arranged that the said inner ring will not bear upon the material being bored and of course will not rub on it and cause friction and prevent the brace or auger and the gage-rods from being readily turned. Of course it is to be understood that different lengths or sizes of augers or bits may be used in connection with this gage. All that is necessary is to place the clamp on the shank of the bit so that the upper face of the gage will register "0" when the point of the bit is projecting into the material, with the lowest cutting edge resting on said material.

It is believed from the above description that the manner of constructing my invention and its operation will be readily understood. While I have shown the outer part of the support as circular in form, it may be of a different shape. However, it is only necessary that the opening therein should be circular, so that the inner ring may be mounted and rotate in said support. It is also not necessary that the antifriction-balls be used; but of course it is understood that a device provided with these balls will operate more satisfactorily and easily than without them. A greater or less number of gage or scale rods than shown may also be used. Another form of clamp may be used than that shown and other changes may be made in the device without departing from the spirit of my invention. I therefore do not limit myself to the exact construction herein described, and shown in the accompanying drawings; but

What I claim as new, and desire to secure by Letters Patent, is—

1. In a bit or auger gage, a support, independent of the auger, so that the auger may be forced into the material bored without moving the support laterally with it, a gage-rod connected to the support, and a clamp on the gage-rod adapted to grasp the auger, as and for the purpose set forth.

2. In a bit or auger gage, a support adapted to bear at all times upon the material being bored, a gage-rod connected to the support and a clamp on the gage-rod adapted to grasp the auger as and for the purposes set forth.

3. In a bit or auger gage, a support independent of the auger, gage-rods carried by said support having a scale thereon, a clamp on the gage-rod adapted to grasp the shank of an auger and to move therewith, whereby the depth the auger has entered the material operated upon may be read on the scale.

4. In a bit or auger gage, a support adapted to bear at all times upon the material being bored, gage-rods carried by said support having a scale thereon, a clamp on the gage-rod adapted to grasp the shank of an auger and to move therewith, whereby the depth the auger has entered the material being bored may be read on the scale.

5. In a bit or auger gage, a support, gage-rods adapted to move in a circle in said support, a clamp adapted to move longitudinally on said rods and to clasp the auger.

6. In a bit or auger gage, a support having a circular opening therein, means adapted to rotate in said openings, gage or scale rods attached to said means, a clamp movable longitudinally of said rods and adapted to grasp or be clamped to the auger, as and for the purpose set forth.

7. In a bit or auger gage, a support having a circular opening therein, a ring rotating in said support, rods connected to said ring having scales thereon, a clamp moving longitudinally of said rods, said clamp being adapted to clasp the auger, as and for the purpose set forth.

8. In a bit or auger gage, a support having a circular opening therein, a ring adapted to rotate in said opening, antifriction-balls between the ring and said support, rods connected to said ring and having scales thereon, a clamp moving longitudinally of said rods and adapted to grasp an auger, as and for the purpose set forth.

9. In a bit or auger gage, a support having a circular opening therein, an internally-projecting flange on said support, rods having scales thereon, means to which the rods are attached, said means having a flange which overlaps the first-mentioned flange, a clamp adapted to move longitudinally upon said rods and to clasp an auger as and for the purpose set forth.

10. In a bit or auger gage, a support having a circular opening therein, an internally-projecting flange on said support, means rotating on said support and on said flange, rods having scales thereon connected to said means and rotating therewith, a clamp moving longitudinally on said rods and rotating with said rods and adapted to clasp an auger as and for the purpose set forth.

11. In a bit or auger gage, a support having a circular opening therein, an internally-projecting circular flange, a device adapted to rotate in said opening, said device having an outwardly-projecting flange overlapping the first-mentioned flange, antifriction-balls between said flanges, rods connected to said means having scales thereon and adapted to rotate with said means, a clamp moving longitudinally of said rods and rotating therewith, said clamp being adapted to clasp an auger, as and for the purpose set forth.

12. In a bit or auger gage, a support, means on said support to hold it on the material operated upon, a device rotating in or on said support, rods connected with said means and moving in a circle therewith, said rods having scales thereon, a clamp adapted to be attached to an auger, said clamp moving longitudinally of said rod and adapted to rotate therewith.

13. In a bit or auger gage, a support having screws therein, the points of which project below the lower surface of said support, a circular opening in said support having an internally-projecting flange, a ring adapted to rotate in said support having a flange overlapping the first-mentioned flange, balls between said flanges on which said ring rotates, gage-rods having scales thereon attached to said inner ring and adapted to move in a circle therewith, said rods having scales thereon, a clamp adapted to grasp an auger and to move longitudinally of the rods and to rotate the said inner ring through the rods when the auger is rotated, as and for the purpose set forth.

14. In a bit or auger gage, a support, screws projecting through the lower surface of said support and adapted to enter the material operated on and to hold the support in place, said support having a circular opening therein and an internally-projecting flange, a ring rotating in the opening in said support having an outwardly-projecting flange, balls between said flanges and on which the ring rotates, a ring overlapping the support and inner ring and attached to the said support, rods having scales thereon connected to said ring, a clamp adapted to clasp an auger, said clamp moving longitudinally of said rods and adapted to turn said rods and the ring when the auger or bit is turned.

15. In a bit or auger gage, a support having a circular opening therein, an internally-projecting flange, a device rotating in said opening, said device having an opening therein, gage-rods connected to said device having scales thereon, a clamp moving longitudinally of said rods and adapted to clasp an auger and to rotate said rods and said device in the support when the auger is turned, as and for the purpose set forth.

16. In a bit or auger gage, a support having a circular opening therein, an internally-projecting flange on said support, a device rotating in said opening, said device having an outwardly-projecting flange which overlaps the first-mentioned flange, antifriction-balls between said flanges on which said device rotates, means for holding the support and said device together, means projecting below the lower surface of the support to hold it in position on the material operated upon, gage-rods having scales thereon attached to said means, a clamp adapted to clasp an auger, said clamp moving longitudinally on said rods and adapted to turn said rods and said device when the auger is turned, as and for the purpose set forth.

17. A bit or auger gage, support having a circular opening therein, an internally-projecting flange, a device rotating in said support having an outwardly-projecting flange overlapping the first-mentioned flange, means connected to the support to prevent the said device from being separated from said support, as and for the purpose set forth.

18. A bit or auger gage, support having a circular opening therein and an internally-projecting flange, a ring fitting in said opening, said ring having an outwardly-projecting flange which overlaps the first-mentioned flange, antifriction-balls between the said flanges and on which said ring rotates, another ring fastened to said support and overlapping the flange of the inner ring, and means connected to said support to prevent said support from moving on the material.

19. In a bit or auger gage, a support having a circular opening therein, an internally-projecting flange, a device having an opening in the center thereof rotating in said support, said device having an outwardly-projecting flange overlapping said first-mentioned flange, antifriction-balls between said flanges and on which said device rotates, means connected to the support and overlapping the said device to prevent the device from being accidentally separated from the support, gage-rods connected to said means having scales thereon, a clamp adapted to grasp an auger, said clamp moving longitudinally of said rods and adapted to rotate the said device when the auger is turned, as and for the purpose set forth.

20. In a bit or auger gage, a support having a circular opening therein, an internally-projecting flange, a device having an opening in the center thereof rotating in said support, said device having an outwardly-projecting flange overlapping said first-mentioned flange, antifriction-balls between said flanges and on which said device rotates, means connected to the support and overlapping the said device to prevent the device from being accidentally separated from the support, guide-rods connected to said means having scales thereon, a clamp having openings through which the said guide-rods pass, jaws movable in said clamp adapted to grasp an auger, said clamp adapted to move longitudinally of said rods and to move said rods when the auger is rotated, as and for the purpose set forth.

21. In a bit or auger gage, a support having a circular opening therein, an internally-projecting flange, means inside of said support having an opening in about the center thereof, an outwardly-projecting flange on said means overlapping the first-mentioned flange, antifriction-balls between said flanges and on which said means rotates, a device connected to said support and overlapping said outwardly-projecting flange, means projecting below the lower face of the support to hold it in position on the material operated upon, gage-rods connected to said means inside of said support, said rods having scales thereon, a clamp having openings therein through which said rods pass, jaws moving in said clamp and adapted to be moved to or from the center of said clamp to grasp an auger whereby when the auger is turned the clamp will be rotated to move the gage-rods therewith and also rotating the means inside of the support.

22. In a bit or auger gage, a support having a circular opening therein, an internally-projecting flange, means inside of said support having an opening in or about the center thereof, an outwardly-projecting flange on said means overlapping the first-mentioned flange, antifriction-balls between said flanges and on which said means rotates, a device connected to said support and overlapping said outwardly-projecting flange, means projecting below the lower face of the support to hold it in position on the material operated upon, gage-rods connected to said means inside of said support, said rods having scales thereon, and a clamp having outwardly-projecting arms thereon, each of said arms having an opening therein through which a gage-rod passes, jaws movable in said clamp toward and from the center thereof adapted to grasp an auger, means for moving said clamps, the device operating as and for the purpose set forth.

23. In a bit or auger gage, a support, gage-rods adapted to move in a circle in said support, a clamp adapted to move longitudinally of said rods and to clamp the auger, said clamp consisting of a frame having arms projecting therefrom, openings in said arms adapted to receive the rods of an auger-gage, jaws adapted to move toward and from the center of said clamp as and for the purposes set forth.

24. In a bit or auger gage, a support having a circular opening therein, a ring rotating in said support, rods connected to said ring, a clamp moving longitudinally of said rods, said clamp consisting of a main body portion, arms radiating therefrom, said arms having openings therein through which the rods may pass, said main body portion having slots thereon, clamped jaws moving in said slots, and means connected to the clamp to move said jaws toward and from the center of said clamps.

25. In a bit or auger gage, a support having a circular opening therein, means adapted to rotate in said support, rods connected to said means, a clamp movable longitudinally of said rods and adapted to be clamped to the auger, said clamp consisting of a main body portion, arms radiating therefrom, said arms having openings thereon through which the arms may pass, said main body portion having slots thereon, clamped jaws moving in said slots, said jaws having open and lower flanges on which said jaws are guided in said slots, and means for moving the said jaws toward and from the center of the clamp.

In testimony whereof I affix my signature in the presence of two witnesses.

SAMUEL RUSSELL DUMMER, Jr.

Witnesses:
H. M. SEAMANS,
I. V. SCOTT.